United States Patent [19]
Pivar

[11] 4,325,448
[45] * Apr. 20, 1982

[54] THREE-WHEELED, MOTOR-POWERED, PEDAL-STARTED VEHICLE

[75] Inventor: Stuart Pivar, New York, N.Y.

[73] Assignee: American Microcar Incorporated, Farmingdale, N.Y.

[*] Notice: The portion of the term of this patent subsequent to Dec. 9, 1997, has been disclaimed.

[21] Appl. No.: 133,862

[22] Filed: Mar. 25, 1980

Related U.S. Application Data

[63] Continuation of Ser. No. 963,282, Nov. 24, 1978, Pat. No. 4,237,995.

[51] Int. Cl.$^3$ .................... B60J 1/06; B62D 61/08; B62M 7/04
[52] U.S. Cl. .................... 180/215; 180/210; 180/216; 280/282; 280/289 S; 296/78.1
[58] Field of Search .............. 180/210, 215, 216, 217; 280/282, 289 S; 296/78 R, 78.1

[56] References Cited

U.S. PATENT DOCUMENTS

| | | | |
|---|---|---|---|
| 3,053,550 | 9/1962 | Kunsch et al. | 180/215 |
| 3,117,648 | 1/1964 | Landreth | 180/210 |
| 3,284,130 | 11/1966 | Michael | 296/78.1 |
| 3,580,348 | 5/1971 | Blasi | 180/210 |
| 4,183,418 | 1/1980 | Dudas | 180/216 |
| 4,237,995 | 12/1980 | Pivar | 180/210 |

FOREIGN PATENT DOCUMENTS 1142921 9/1957 France .................... 296/78.1

Primary Examiner—Joseph F. Peters, Jr.
Assistant Examiner—Donn McGiehan
Attorney, Agent, or Firm—Posnack, Roberts, Cohen & Spiecens

[57] ABSTRACT

A three-wheeled, motor-driven, pedal-started vehicle which comprises a tubular frame supporting the wheels in triangular relationship. A seat is provided on the frame covering a trunk or receptacle relative to which the seat is pivotable in order to uncover the trunk or receptacle. A motor and pedal arrangement is provided on the frame for driving one of the wheels. A kickstand is provided to elevate this wheel selectively from the ground to facilitate the starting of the vehicle without the need for driving the weight of the same. A demountable canopy is detachably connected to the tubular frame and provides a transparent shield for the driver of the vehicle. The seat is such as to be able to accommodate the driver and at least one passenger in side by side relationship. A steering arrangement is provided having a jog therein to accommodate the offset relationship of the driver to the central axis of the vehicle when a passenger is accommodated. This steering device is also provided with an offset in order to yield to impact forces. The rearmost wheels are mounted for pivotal displacement.

19 Claims, 8 Drawing Figures

THREE-WHEELED, MOTOR-POWERED, PEDAL-STARTED VEHICLE

CROSS-RELATED APPLICATION

This application is a continuation of my earlier co-pending application, Ser. No. 963,282, filed Nov. 24, 1978, now U.S. Pat. No. 4,237,995.

FIELD OF INVENTION

This invention relates to vehicles supported by three wheels.

BACKGROUND OF INVENTION

Many vehicles are known which are supported on three wheels and which are motor driven. Vehicles are also known which are motor driven with the motor being pedal-actuated and, thereafter, being self-sustaining due to the supply of fuel from a fuel tank or the like or due to the fact that the electrical system becomes self-sustaining after it has first been started.

Vehicle of the type under discussion are not known to embody safety features whereby the steering gear thereof collapses under impact thereby providing a safety feature for the driver and his passenger.

From a survey of the prior art patents, it is believed that no adequate provision has been made in three-wheeled vehicles for storage space, thereby severely limiting the use of vehicles of the above-noted type. Moreover, no provision has been made in the type of vehicles under discussion to facilitate the starting thereof and to remove from the driver the burden of supplying power to overcome the initial inertia of the vehicle.

In reviewing the prior art patents, the following U.S. patents have been examined:

| | | |
|---|---|---|
| 630,976 | 1,370,374 | 3,053,550 |
| 631,437 | 1,371,842 | 3,294,190 |
| 631,438 | 1,382,942 | 3,512,599 |
| 633,014 | 1,383,933 | 3,572,456 |
| 710,630 | 1,876,155 | 3,583,727 |
| 723,168 | 1,933,101 | 3,598,195 |
| 767,529 | 1,933,102 | 3,759,339 |
| 1,055,960 | 1,956,319 | 3,776,353 |
| 1,103,254 | 2,034,158 | 3,827,519 |
| 1,200,379 | 2,488,123 | 3,888,324 |
| 1,338,680 | 2,633,030 | 3,964,563 |
| 1,369,540 | 2,819,093 | Des. 126,663 |

SUMMARY OF INVENTION

It is an object of the invention to provide an improved three-wheel vehicle which avoids the shortcomings of the prior art as set forth hereinabove.

In accordance with the invention, there is provided a motorized tricycle which is stable and comfortable and provides for a secure ride and which is, more particularly, especially suitable for driving around in urban areas.

It is a further object of the invention to provide an improved three-wheel vehicle which is relatively easy to park and which may be designed to be shorter than the width of a car so that it can slip into any approximately three foot space with the nose thereof being directed to the curb.

It is another object of the invention to provide an improved motorized tricycle having a maneuverability which is especially suitable for heavy city traffic.

It is another object of the invention to provide an improved motorized tricycle which, for example, in the suburbs can take the place of a second car for short trips, grocery shopping, chauffeuring children and commuter parking and which would be particularly suitable for college campuses and, as well, for senior citizens.

It is a further object of the invention to provide an improved motorized tricycle having accommodations for a driver and a passenger and, as well, for storing packages or the like.

Still another object of the invention is to provide an improved motorized tricycle having expanded usefulness and sociability while still providing a practical and economical motor transportation.

In achieving the above and other objects of the invention, there is provided an improved vehicle comprising a frame, three wheels disposed in triangular relationship on and supporting said frame, seating arrangements on said frame, a steering arrangement coupled to and adapted for steering at least one of said wheels, motor arrangements on said frame for driving at least one of said wheels, and an energy supply on said frame to supply energy to said motor arrangement.

In accordance with said invention, the seating arrangement is of a breadth to support at least two passengers in side-by-side relationship.

According to one aspect of the invention, the aforesaid frame includes parallel lateral sections each comprising: a bottom horizontal tube aligned longitudinally, a forward tube extending upwardly from said horizontal tube, and a rear tube extending upwardly from said horizontal tube; said frame further including a sheet interconnecting the forward tubes of the sections, a transverse tube interconnecting the rear tubes, and wing sections extending outwardly of said lateral sections.

According to a further development of the invention, the vehicle may comprise a back support arrangement coupled to said rear tubes and including a U-shaped tube forming arm rests and an interconnecting back extending between said arm rests, further tubes extending downwardly from said arm rests, and L-shaped tubes arranged in parallel and extending across and being fixed to said arm rests and further tubes. Said back support arrangement may further include a further transverse tube extending between and connected to said L-shaped tubes and a bracing tube extending between and connected to said back and said further transverse tube.

In accordance with another aspect of the invention, there may be provided a rotatable yoke mounted on the aforesaid sheet and straddling and coupled to the wheel which is adapted for being steered, said steering arrangement being coupled to said yoke. The steering means may include a steering tube which is adapted for yielding under pressure and is connected to said yoke, with handlebars being provided on said steering tube. The steering tube may, moreover, be comprised of first, second and third serially interconnected sections, said first section being connected to said yoke to turn the same, said second section being generally horizontal, said third section extending upwardly at an angle from the second section and forming an angle therewith constituting a yieldable bend.

As another feature of the invention, said second section may provide a transverse offset or jog between the first and third sections, the offset or jog being transverse relative to said frame. The third section may, moreover, be located at a position about one third across the frame considered in the transverse dimension thereof.

According to the invention, there is also provided a U-shaped tubular frame detachably and teliscopically supported in the forward tubes of the frame and having a vertical section in extension of the forward tubes and a horizontal section extending rearwardly of said vertical section and forming a canopy support. A cover can be provided on the horizontal section to constitute a canopy. Furthermore, the vertical section may include parallel generally vertical tubes and a transverse tube extending between the latter said vertical tubes, there being comprised an opaque shield extending between the vertical tubes of the vertical section below the transverse tube thereof. Still further, there may be provided a transparent shield supported on the vertical section above the latter said transverse tube.

The canopy section may, moreover, be provided with a transparent section which is pivotal and which is attached by Velcro connectors in order that the transparent shield be so detached from the canopy support that it is pivotal to a position of storage beneath the canopy.

In further accordance with the invention, there is provided a receptacle or trunk on the frame below the seating arrangement, the seating arrangement constituting a cover for the receptacle. An arrangement is provided for pivotally mounting said seating arrangement on the frame so that the seating arrangement can be pivoted from the receptacle to open the same.

According to another aspect of the invention, fenders may be provided on opposite sides of the seating arrangement and supported thereby over a respective two of the wheels of the vehicle. A locking arrangement may be provided on the seating arrangement and receptacle and to lock the cover on the receptacle.

According to a safety feature of the invention, the handlebars include handles which point about 45° from a longitudinal axis defined by the frame of the vehicle. Moreover, two of the wheels of the vehicle are rearmost wheels arranged in parallel and levers may be provided connecting the rearmost wheels to the frame for pivotal displacement. Springs may be provided yield by resisting this displacement.

Further objects, features and advantages will be found in the following detailed description of some preferred embodiments as illustrated in the accompanying drawings.

DETAILED DESCRIPTION

The vehicle provided in accordance with the invention is a motorized tricycle or moped. It is provided with a motor which has a self-sustaining action after it has been initially started. The vehicle is started with a pedal action which overcomes the inertia of the weight of the vehicle and enables the motor to be engaged in self-sustaining operation whereafter the supply of fuel and the braking of the vehicle enables the vehicle to be maneuvered for purposes of transportation. As will be shown, the vehicle has a sufficiently wide seat with enough space besides the driver for a passenger and for packages or the like. Underneath the seat of the vehicle is a sizable trunk.

The above arrangements greatly expand the vehicle's usefulness as well as its social characteristics, while providing a practical and economical mode of transportation for which mopeds are well known. The vehicle is, moreover, very stable and gives a comfortable and secure ride.

The frame of the vehicle is fabricated of welded steel tubing. The wheels which will be referred to hereinbelow may, for example, be 16 inch spoke-type wheels. The brakes will be hand-operated drum brakes on the front and on one rear wheel. The weight of the vehicle may be, for example, approximately 140 pounds, the vehicle having an overall length of about 74 inches and an overall width of about 36 inches. The front suspension may be a telescopic fork and the rear suspension, as will be shown, is a swing arm provided with shock absorbers.

The engine which will be referred to hereinafter can be a two-cycle single-cylinder 49 cc. 1.5 horsepower engine with an automatic clutch and with a band-operated engagement lever.

The transmission of the vehicle may, for example, be an automatic centrifugal clutch connected by chain drive to a live rear axle. The ignition of the vehicle may, for example, be a Magneto six volt 23 watt ignition. The starting characteristic of the vehicle, as mentioned hereinabove, is a pedal start. The tire size will be 16×2¼. Fuel tank capacity may in a preferred design to 1.5 gallons and the fuel which will be employed will be a gasoline-oil mixture, the fuel being employed with great economy.

Figure 1:
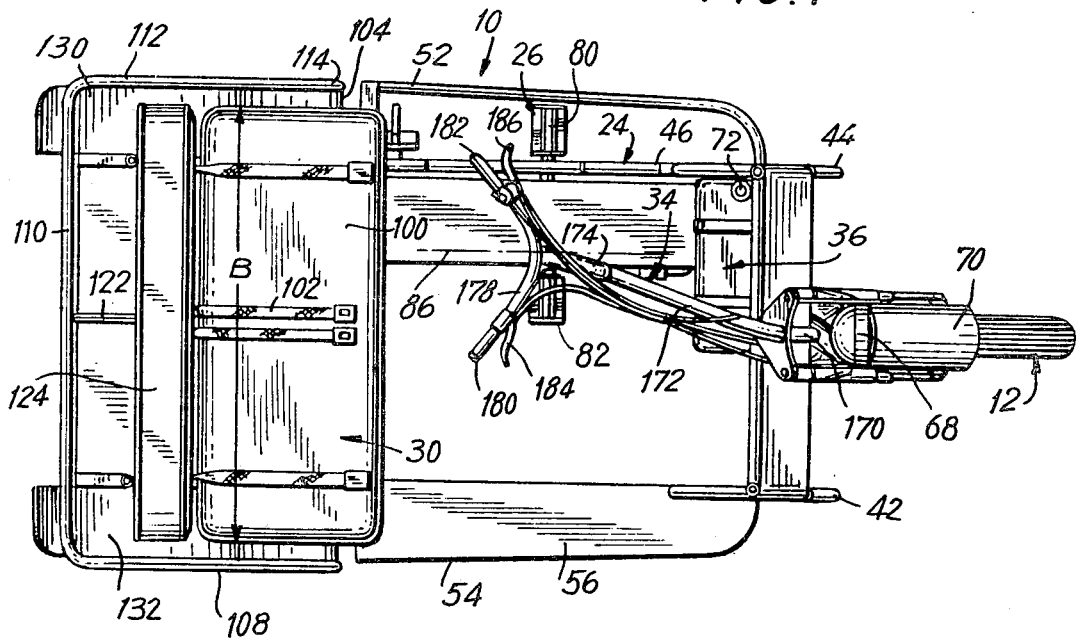
FIG. 1 is a top view of a motorized tricycle provided in accordance with the invention.
Figure 2:
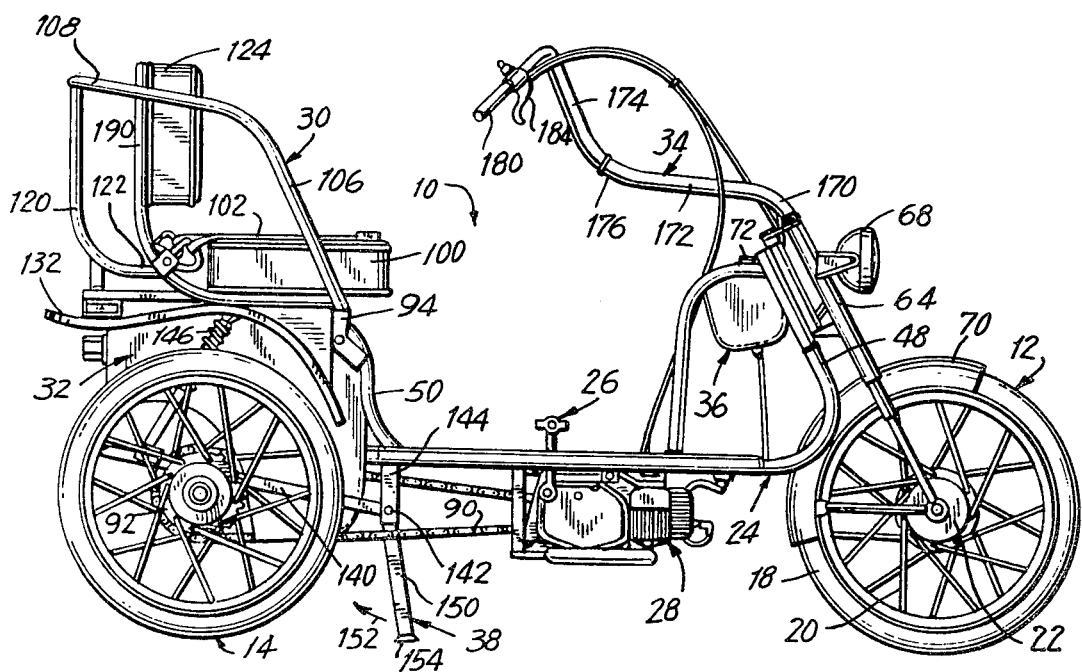
FIG. 2 is a side view of the motorized vehicle of FIG. 1.
Figure 3:
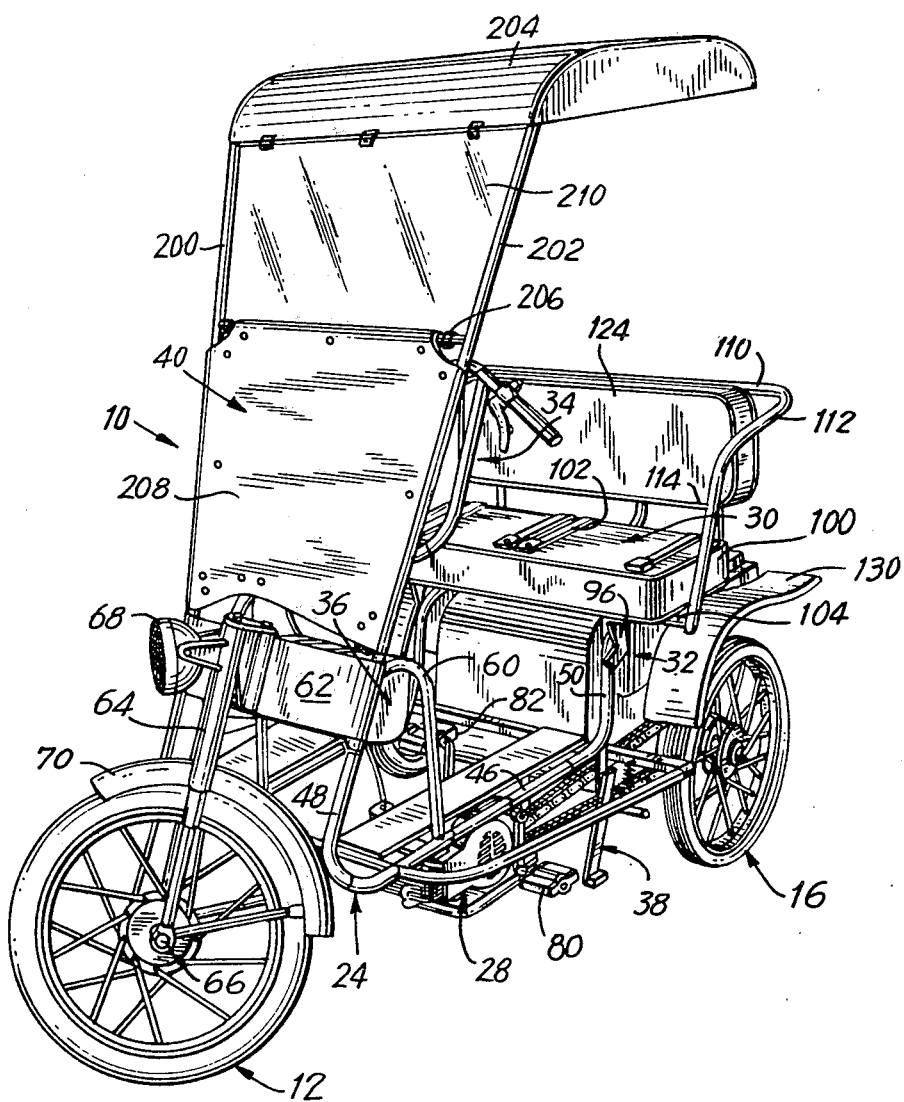
FIG. 3 is a perspective view of the motorized vehicle of FIGS. 1 and 2 with a canopy arrangement mounted thereon.

Referring next to FIGS. 1–3, illustrated therein is a vehicle 10 having the characteristics generally noted above. The vehicle includes three wheels such as a front wheel 12 and two rear wheels 14 and 16. These wheels are preferably of pneumatic type.

Each wheel, for example, the wheel 12 (FIG. 2) consists of a tire 18, spokes 20, and a hub 22. The tires can be pneumatically inflated in conventional manner.

The vehicle consists of a tubular frame 24, a pedal arrangement 26, a motor arrangement 28, a seating arrangement 30, a storage arrangement 32, a steering arrangement 34, a fuel tank 36 and a kickstand arrangement 38. It may also include a canopy arrangement 40.

The frame 24 consists of two lateral sections 42 and 44. Each lateral section includes a horizontal tube 46, a forward tube 48 and a rear tube 50. The forward tube 48 is of generally verticle attitude, but preferably slopes rearwardly at, for example, an angle of 60–70 degrees. The rear tube 50 of each section is also of generally verticle attitude extending upwardly from the horizontal tube 46. Extending laterally from each lateral section is a wing section 52 and 54. The section 54 is preferably covered with floorboard which may be fabricated of wood, plastic, rubber or the like such as indicated at 56.

The front tubes 48 of the lateral sections of the frame are braced by bracing tubes 60 which extend between and are connected to the front tubes 48 and to the horizontal tubes 46. Moreover, a strap or sheet 62 is provided which is connected between the front tubes 48, this strap being fabricated of steel or some other such heavy constructional material. The tubes 48 open upwardly for a purpose to be explained hereinafter.

A yoke 64 is mounted on the strap 62. This yoke straddles the front tire 12 to which it is connected, such as, for example, at free wheeling axle 66 to permit rotation of the wheel 12 and a steering of the latter by means of a steering arrangement to be described in greater detail hereinafter. A headlamp 68 may be mounted on the yoke 60 as may be a fender 70 which shields the wheel 12. Fuel tank 36 is supported by front tubes 48 and strap 62. It is provided with a cap 72 for the filling of the tank with the gasoline-oil mixture which is used to power the vehicle.

As mentioned hereinabove, the motor arrangement 28 of the vehicle, is a pedal-started self-sustaining motor arrangement such as, for example, a two-cycle single-cylinder 49 cc.1.5 horsepower automatic clutch engine. It is started by the use of pedal arrangement 26 which includes pedals 80 and 82. The pedal arrangement and motor arrangement are located about one third of the way across the transverse dimension of the vehicle or frame as indicated by the disposal of the longitudinal axis 86 which is defined by the vehicle. In fact, the pedals 80 and 82 straddle this axis as well as the left hand lateral section of the frame of the vehicle.

The motor arrangement 28 is effectively coupled to the wheel 16 of the vehicle by a chain 90. This chain 90 is driven either by pedal arrangement 26, or by motor arrangement 28 after the latter has commenced operation. The chain is engaged with the tire by means of a gear 92 visable in FIG. 2.

Illustrated in FIGS. 2 and 3 is a pivot 94 and a pivot 96, these pivots being supported on the rearmost tubes 50 of the frame of the vehicle. These pivots support the seating arrangement 30 and enable the same to be tilted forward away from the receptacle or trunk 32. The seating arrangement constitutes a cover for the trunk 32 and the tilting forward of the seating arrangement on pivots 94 and 96 enables an uncovering of the trunk 32 for a loading or unloading of the same. This arrangement will be described in greater detail hereinafter with reference to some slightly modified embodiments of the invention.

The seating arrangement of the invention includes a seat 100 having saftey belts 102 in operative association therewith. The safety belts are so disposed as to accommodate a driver and a passenger in side-by-side relationship. The breadth of the seat 100 as indicated at B, may be in the order of three feet, thereby comfortably accommodating two adults in side-by-side relationship.

The seating arrangement is also constructed with a tubular frame which is connected to a transverse 104 which is connected to the pivots 94 and 96. A U-shaped tube is connected to tube 104. It includes a generally verticle tube 106 connected to a rearwardly extending horizontal tube 108 connected in turn to a rear tube 110 in turn connected to a horizontal tube 112 and then to a vertical tube 114. An L-shaped tube having a vertical section 120 and a horizontal section 122 braces the rear of the seating arrangement and supports a back support 124.

As will be seen hereinafter, the seating arrangement supports a pair of fenders 130 and 132 which shield the rearmost tires and which tilt away with the seating arrangement from the trunk 32 to uncover the same.

The rearmost wheels of the vehicle are supported on a respective swing arm 140 mounted on pivots 142, in turn mounted on brackets 144 supported on the frame of the vehicle. The respective ends of the swing arms 140 are connected back to the frame of the vehicle by means of shock absorbers 146. This enables the rear wheels of the device to accommodate irregularities in the ground traversed without imparting these in direct magnitude to the frame of the vehicle.

As has been noted hereinabove, the frame of the device is provided with a kickstand 38. As will be explained in greater detail hereinafter, the kickstand 38 includes a lever 150 pivotally mounted on pivot 142 and capable of being swung or pivoted rearwardly in the direction indicated by arrow 152. The kickstand arrangement 38 has extended and collapsed conditions. In the extended condition, the foot 154 of the lever 150 extends below the wheel 16 so that the latter can be elevated from the ground whereby it may be rotated under the operation of pedal arrangement 26 without the driver having to overcome the inertia of the weight of the vehicle. In operation, the driver will place the kickstand arrangement in extended condition thereby elevating the wheel 16 from the ground. The driver or operator will then work the pedals in such a manner as to operate the chain 90 to rotate wheel 16 and to actuate the motor arrangement 28. The motor arrangement 28, once started, will have a self-sustaining ignition system thereby obviating the need for operation of the pedal arrangement 26. When the motor arrangement has been started or actuated the driver will throw his weight forward thereby collapsing the kickstand arrangement 38 at which time the lever 150 will pivot backwardly in the direction indicated by arrow 152, thereby to assume the collapsed condition in which it has no position of interference with the ground traversed. The driver may then operate the vehicle exlusively by controlling the motor arrangement 28.

The steering arrangement 34 of the vehicle is of tubular construction. It consists of a first section 170 connected to a second section 172 which is connected in series to a third section 174. The section 172 is a generally vertical although inclined section, connected in extension of the yoke 64 to which it transmits a rotary control motion. The section 172 is a generally horizontal section connected to the section 170 and in turn supporting the generally vertical section 174 to which it is connected at junction 176. The junction 176 constitutes a yieldable bend by virtue of which the steering arrangement may collapse in response to an impact force such as may be caused by a passenger or operator being thrown thereagainst in the event of an accident or the like. The jog or offset provided in the steering arrangement thus constitutes a safety feature of the invention intended for the purpose of minimizing the effects of accidents or the like.

As will appear more clearly from FIG. 1, the second or central section 172 of the steering arrangement also povides a transverse jog or offset, the purpose of which is to locate the handle bar 178 at such a position as to straddle the axis 86 located approximately one third of the way across the transverse dimension of the frame. The purpose of this jog and the location of the handle bars is to make the vehicle especially adapted for operation in carrying an operator by himself or an operator in conjunction with a passenger so that the offset of the handle bars due to the job afforded by central section 172 aligns the handle bars with the pedal arrangement 26, thereby to facilitate operation of the device with the operator offset from a central location.

Indicated on the handle bar 178 adjacent handles 180 and 182, are controlled 184 and 186. These controls are representative of the braking controls and throttle and clutch controls which are included in the steering arrangement, but which are not shown in detail in the drawing.

In the foregoing description of the seating arrangement and frame of the vehicle, it will be noted that the back support 124 mounted on the frame of the seating arrangement is supported on an L-shaped tubular member such as indicated at 190, all of which is tiltable away from the trunk or receptacle 32 as has been generally described hereinabove. It will be noted that the safety straps 102 are connected to the tubular member 190 to provide an anchorage for the same.

There is shown in FIG. 2 the canopy arrangement 40 of which are readily seen the vertical tubes 200 and 202 forming two legs of a U-shaped tubular frame, the horizontal section of which is concealed by a canopy or cover 204. A transverse tube 206 extends between the tubes 200 and 202. An opaque shield 208 is connected to the vertical tubes 200 and 202 and to the horizontal tube 206. This shield may be fabricated of canvas or leather or the like. A transparent shield 210 is also mounted on the vertical tubes 200 and 202 although a slightly modified arrangement of this transparent shield will be described subsequently with reference to FIG. 4 which reveals how this transparent shield can be mounted for retraction to a storage position.

It will be noted that the tubes 200 and 202 are telescopically and demountably or detachably engaged with the front tubes 48 of the frame of the vehicle so that the mounting of the canopy is optional and especially suited for use in connection with inclement weather conditions or severe sun conditions or the like.

Figure 4:
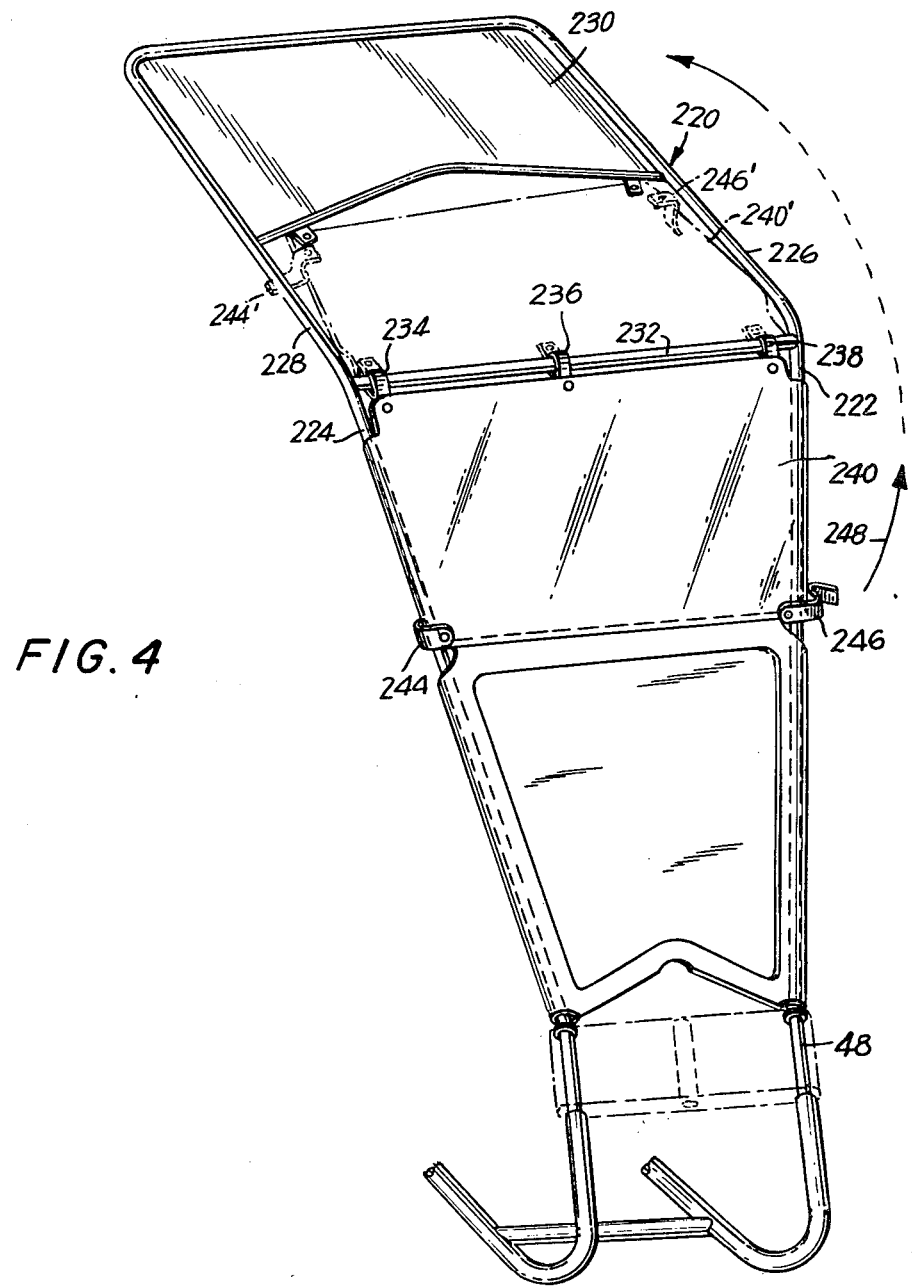
FIG. 4 is a perspective partially diagramatic view of the canopy arrangement mounted on the forward tubes of the frame of the vehicle.

FIG. 4 illustrates a somewhat modified canopy arrangement suitable for use with vehicles of the invention. Herein appear the front tubes 48 of the frame of the vehicle and the U-shaped frame referred to, but unidentified with respect to FIG. 3. In FIG. 4 this U-shaped frame appears more clearly in the form indicated at 220. This U-shaped frame including vertical tubular members 222 and 224 and a horizontal section consisting of lateral tubes 226 and 228 which in turn support a canopy or cover 230 fabricated of canvas,, plastic, leather, rubber or the like. Herein, it is indicated that the junction of the tubes 222 and 226 on the one hand, and 224 and 228 on the other hand, support a transverse tube 232 to which are attached Velcro fasteners 234, 236 and 238, the function of which is to support transparent shield 240 fabricated of plastic or the like. The bottom extremity of the transparent shield 240 is connected by Velcro tabs 244 and 246, these being detachable to permit the shield 240 to be pivotably retracted as indicated by arrow 248 to a position such as indicated at 240' beneath the canopy whereat fasteners 244 and 246 may assume the position shown at 244' and 246' to hold the shield 240 in the storage position indicated at 240'.

It will of course, be understood that tubes 222 and 224 are telescopically and detachably accommodated in front tubes 48 in the frame of the vehicle so that the canopy as a whole may be detached from the vehicle and stored for use as selectively desired.

Figure 5:
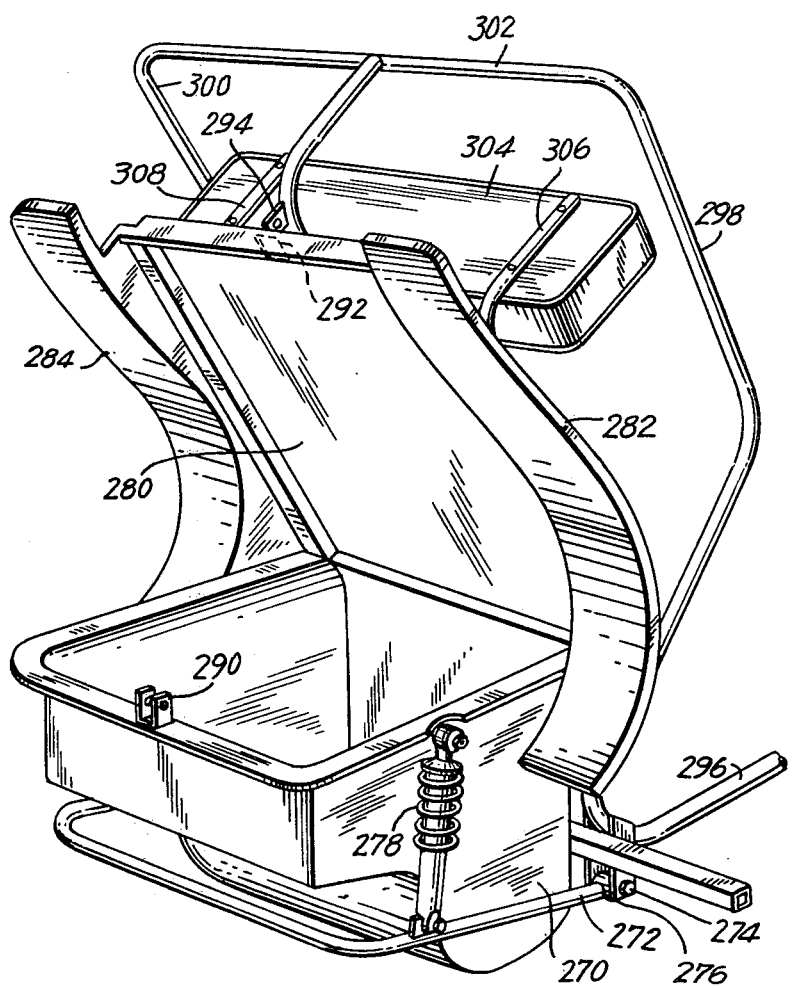
FIG. 5 is a perspective view of a slightly modified embodiment of the invention, the trunk being shown in open condition.

FIG. 5 illustrates a slightly modified embodiment of the invention. Herein, a receptacle 270 is provided which is cast out of a single monolithic piece of plastic material which is mounted in turn on the frame of the vehicle. The receptacle 270 is in effect mounted on a pair of swing arms 272 pivotably mounted at 274 on brackets 276, there being a pair of shock absorbers 278 connected between the swing arms 278 and the receptacle 270 itself.

As noted hereinabove, the cover 280 is pivotably mounted with respect to the receptacle 270 and constitutes the part of a seating arrangement to which fenders 282 and 284 are fixedly connected. Thereby the cover is pivotable away from the trunk or receptacle to enable loading or unloading of the same while at the same time the fenders 282 and 284 are pivotable away from the associated wheels (not shown) to enable repair and maintenance work to be done on the same.

In the illustrated embodiment, tabs 290 are mounted on the receptacle. These tabs extend through opening 292 in the cover 280 of the receptacle to engage with tab 294 and a lock (not shown) in locking engagement so that the contents of the trunk or receptacle 270 may be maintained in secure manner.

In the illustrated embodiment of the invention, the frame of the vehicle is illustrated partially at 296. The arm rests 298 and 300 are shown as collectively supporting rear tube 302 which is monolithically fabricated therewith. A back support 304 is supported by tubular supports 306 and 308, all of these being movable as a unit with the cover 280 when the latter is pivoted relative to receptacle 270 in FIG. 5.

Figure 6:
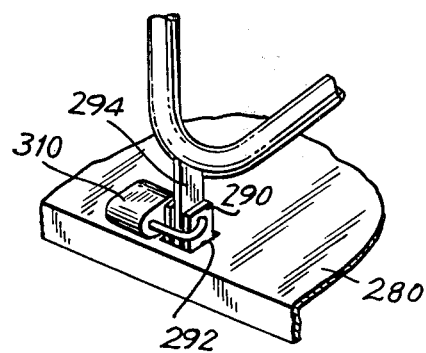
FIG. 6 illustrates a locking arrangement for the trunk of FIG. 5.

FIG. 6 illustrates in greater detail the utilization of the locking arrangements set forth hereinabove. In FIG. 6 are illustrated tabs 290 and 294, these being perforated with corresponding perforations to be engaged by a lock or locking member 310, the function of which is to secure the contents of the receptacle 270.

Figure 7:
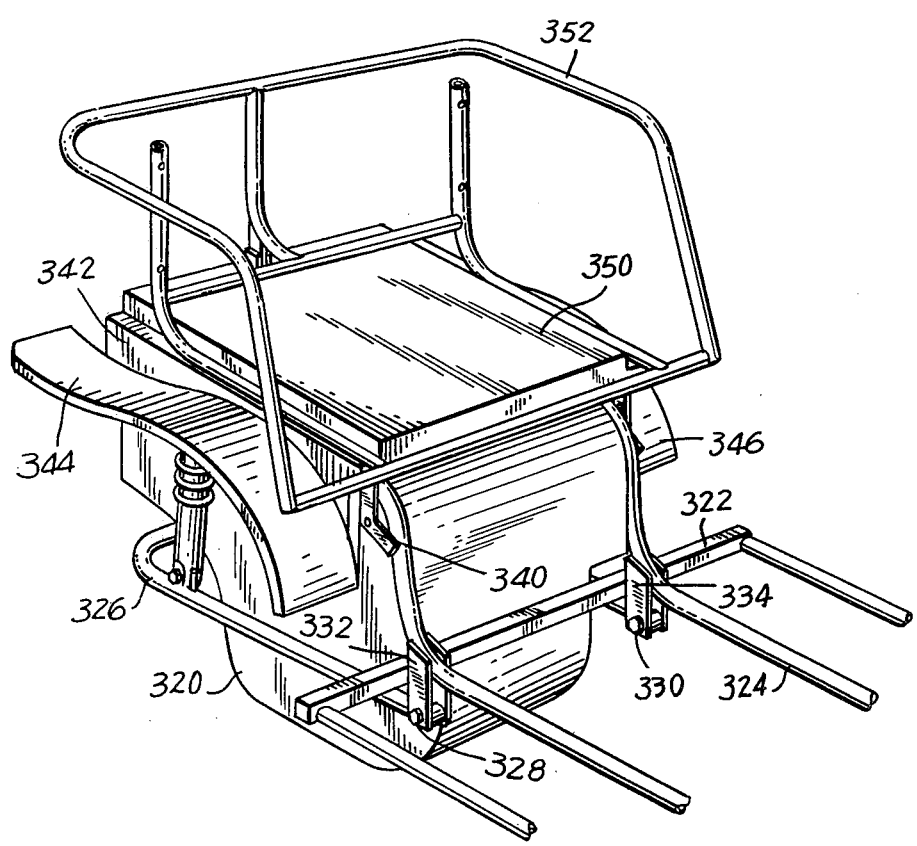
FIG. 7 illustrates in perspective view relative to another slightly modified embodiment of the invention a closed trunk arrangement.

A similar, but somewhat modified embodiment of the invention and the storing facilities is illustrated in FIG. 7 wherein appears the receptacle or storage box 320. The storage box 320 is fabricated of a monolithic plastic body which is in the preferred case reinforced with fiberglass or the like. The storage box 320 is supported on transverse bar 322 connected to the frame 324 of the vehicle. Swing arm 326 supporting the axle of the rearmost wheels is pivotably mounted at 328 and 330 on brackets 332 and 334 mounted on frame 324.

Also mounted on the frame 324 are a pair of pivot brackets 340 to which is affixed the cover 342 of the storage box 320. On the cover 342, are mounted fenders 344 and 346. The cover 342 is permitted to pivot away from the storage box 320 due to the intervention of pivot brackets 340 between the cover and the frame 324 of the vehicle. The cover is constituted in part by a lid 350 on which is supported the tublar frame 352 of the seating arrangement. The frame 352 in the manner described hereinabove, supports the seat and the back support of the device as well as constituting the arm rests and other structural features of the seating arrangements.

Figure 8:
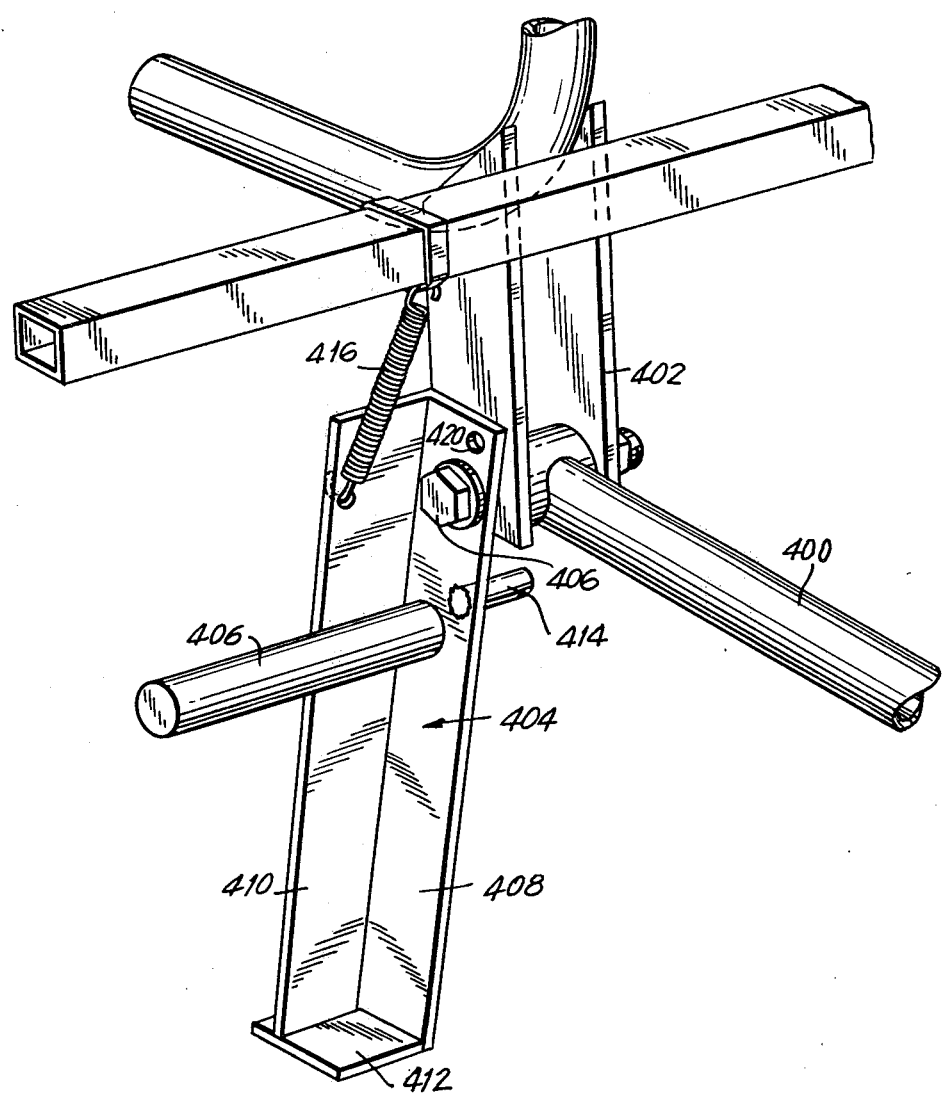
FIG. 8 illustrates in perspective view a kickstand arrangement for the vehicle of the invention.

The kickstand arrangement appears in FIG. 8. Therein may be seen the swing arm 400 supported in bracket 402 with the lever 404 constituting the principle member of the kickstand arrangement depending pivotably from bracket 402. The lever 404 is supported by a pin arrangement indicated at 406. The lever 404 is itself a piece of angle steel having flanges 408 and 410 cooperatively supporting a foot or pad 412. Connected to the flange 408 by a pin 414 is a peg 406 constituting an element through which maneuvering of the lever 404 by the foot of the operator can be effected. A spring 416 resists the movement of the lever 404 which as has been explained hereinabove, has extended and collapsed conditions.

The lever 404 is provided with a perforation 420 there being a corresponding perforation (not shown) in the bracket 402. The purpose of these corresponding perforations is to admit of the insertion of a locking member such as a padlock or the like capable of locking the lever 404 in its extended condition. The purpose of this in turn is to provide a situation wherein one of the rearmost wheels of the vehicle is maintained in a position elevated from the ground so that it is not possible to operate the vehicle thereby to avoid unauthorized operation or transportation of the same.

There will now be obvious to those skilled in the art many modifications and variations of the structures set forth hereinabove. These modifications and variations will not depart from the scope of the invention if defined by the following claims.

What is claimed is:

1. A vehicle comprising a frame, three wheels, disposed in triangular relationship on and supporting said frame, seating means on said frame, steering means on said frame and coupled to and adapted for steering at least one of said wheels, motor means on said frame for driving at least one of said wheels, and energy source means on said frame coupled to and enabling activation of said motor means, said seating means being of a breadth to support at least two passengers in side-by-side relation, a rotatable yoke mounted on said frame and straddling and coupled to the wheel which is adapted for being steered, said steering means being coupled to said yoke, said steering means including a steering tube which is adapted for yielding under pressure and is connected to said yoke, and handlebars on said steering tube, said steering tube including first, second and third serially interconnected sections, said first section being connected to said yoke to turn the same, said second section being generally horizontal, said third section extending upward at an angle from the second section and forming a junction therewith constituting a yieldable bend.

2. A vehicle as claimed in claim 1 wherein said second section provides a transverse offset between said first and third sections, the offset being transverse relative to said frame.

3. A vehicle as claimed in claim 2 wherein said third section is located at a position about one-third across the frame considered in the transverse dimension thereof.

4. A vehicle as claimed in claim 1, said frame including parallel lateral sections each comprising: a bottom horizontal tube aligned longitudinally, a forward tube extending upwardly from said horizontal tube, and a rear tube extending upwardly from said horizontal tube; said frame further including interconnecting means interconnecting the forward tubes of the sections, and wing sections extending outwardly of said lateral sections, said vehicle further comprising a U-shaped tubular frame detachably and telescopically supported in the forward tubes of the frame and having a vertical section in extension of the forward tubes and a horizontal section extending rearwardly of said vertical section and forming a canopy support.

5. A vehicle as claimed in claim 4 comprising a cover on the horizontal section to constitute a canopy.

6. A vehicle as claimed in claim 4 wherein said vertical section includes parallel generally vertical tubes and a transverse tube extending between the said parallel generally vertical tubes.

7. A vehicle as claimed in claim 6 comprising a shield extending between the vertical tubes of the vertical section below the transverse tube thereof.

8. A vehicle as claimed in claim 4 comprising a transparent shield supported on the vertical section above the transverse tube thereof.

9. A vehicle as claimed in claim 6 comprising a further transverse tube connected between said generally vertical tubes at the junction of the vertical and horizontal sections and a transparent shield connected between said transverse tubes.

10. A vehicle as claimed in claim 9 wherein the transparent shield is pivotally connected to said further transverse tube and detachably connected to the other of said transverse tubes whereby the transparent shield can be pivoted to a storage postion under said canopy.

11. A vehicle as claimed in claim 8 comprising Velcro connectors to detachably connect the transparent shield to said transverse tube.

12. A vehicle as claimed in claim 8 comprising Velcro connectors to detachably connect the transparent shield to said horizontal section with said transparent shield in storage position.

13. A vehicle as claimed in claim 1, said frame including parallel lateral sections each comprising: a bottom horizontal tube aligned longitudinally, a forward tube extending upwardly from said horizontal tube, and a rear tube extending upwardly from said horizontal tube; said frame further including interconnecting means interconnecting the forward tubes of the sections, and wing sections extending outwardly of said lateral sections, back support means coupled to said rear tubes, wherein said back support means are pivotally connected to the rear tubes of said frame.

14. A vehicle as claimed in claim 13 comprising a receptacle on said frame below said seating means, said seating means constituting a cover for said receptacle, and means for pivotally mounting said seating means on said frame so that the seating means can be pivoted from said receptacle to open the same.

15. A vehicle as claimed in claim 14 comprising fenders on opposite sides of the seating means and supported thereby over a respective two of said wheels.

16. A vehicle as claimed in claim 15 comprising locking means on said seating means and receptacle to lock said cover on the receptacle.

17. A vehicle as claimed in claim 1 wherein said handlebars include handles which point about 45° from a longitudinal axis defined by said frame.

18. A vehicle as claimed in claim 1 wherein two of said wheels are rearmost wheels arranged in parallel, comprising levers connecting said rearmost wheels to said frame for pivotal displacement.

19. A vehicle as claimed in claim 18 comprising springs yieldably resisting said displacement.

* * * * *